(12) United States Patent
Ishimaru et al.

(10) Patent No.: US 9,672,429 B2
(45) Date of Patent: Jun. 6, 2017

(54) BOUNDARY LINE RECOGNIZER DEVICE (71) Applicant: DENSO CORPORATION, Kariya, Aichi-pref. (JP)

(72) Inventors: Kazuhisa Ishimaru, Kariya (JP); Shunsuke Suzuki, Kariya (JP); Tetsuya Takafuji, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/783,060

(22) PCT Filed: Apr. 4, 2014

(86) PCT No.: PCT/JP2014/059967
§ 371 (c)(1),
(2) Date: Oct. 7, 2015

(87) PCT Pub. No.: WO2014/168083
PCT Pub. Date: Oct. 16, 2014

(65) Prior Publication Data
US 2016/0042236 A1    Feb. 11, 2016

(30) Foreign Application Priority Data

Apr. 8, 2013   (JP) ................... 2013-080477

(51) Int. Cl.
*G06K 9/00* (2006.01)
*G08G 1/16* (2006.01)
(Continued)

(52) U.S. Cl.
CPC ........... *G06K 9/00798* (2013.01); *G06T 7/12* (2017.01); *G08G 1/167* (2013.01); *H04N 7/183* (2013.01);
(Continued)

(58) Field of Classification Search
CPC ...... G06K 9/00798; G06T 2207/20076; G06T 2207/30256; G06T 7/0083; G08G 1/167; H04N 7/183
See application file for complete search history.

(56) References Cited

U.S. PATENT DOCUMENTS 6,850,628 B2 *   2/2005   Shirato ............. G06K 9/00798
                                                                 382/104
6,879,706 B2 *   4/2005   Satoh ................ G06K 9/00798
                                                                 340/907

(Continued)

FOREIGN PATENT DOCUMENTS

JP    2007-264955 A    10/2007
JP    2007-316767 A    12/2007
(Continued)

OTHER PUBLICATIONS

International Preliminary Report on Patentability; International Application No. PCT/JP2014/059967; Filed: Apr. 4, 2014 (with English translation).

(Continued)

*Primary Examiner* — Tom Y Lu
(74) *Attorney, Agent, or Firm* — Knobbe, Martens, Olson & Bear, LLP (57) ABSTRACT

This invention is provided with: a camera for capturing the image of a travel path; an edge point extraction unit for extracting edge points on the basis of the brightness of an image captured by the camera; a candidate line extraction unit for extracting, on the basis of the succession of the extracted edge points, a candidate line for a boundary line demarcating the travel path; a frequency calculation unit for calculating, on the basis of edge points belonging to the candidate line extracted by the candidate line extraction unit, the frequency distribution of the edge points for a parameter that specifies the width of the boundary line; a probability (Continued)

generation unit for calculating, on the basis of the frequency distribution calculated by the frequency calculation unit, the distribution for the probability that the candidate line at the parameter is the boundary line; and a boundary line recognition unit for recognizing the boundary line on the basis of the probability distribution calculated by the probability generation unit.

10 Claims, 3 Drawing Sheets

(51) Int. Cl.
    *H04N 7/18*     (2006.01)
    *G06T 7/12*     (2017.01)

(52) U.S. Cl.
    CPC ............... *G06T 2207/20076* (2013.01); *G06T 2207/30256* (2013.01)

(56) References Cited

U.S. PATENT DOCUMENTS

| | | | |
|---|---|---|---|
| 8,311,283 B2* | 11/2012 | Wu | B60W 30/12 348/148 |
| 2005/0265579 A1* | 12/2005 | Nishida | G06K 9/00798 382/103 |
| 2007/0276599 A1 | 11/2007 | Ogawa | |

FOREIGN PATENT DOCUMENTS

| | | |
|---|---|---|
| JP | 2010-205175 A | 9/2010 |
| JP | 2011-095846 A | 5/2011 |
| WO | 2014/168083 A1 | 10/2014 |

OTHER PUBLICATIONS

International Search Report (translated version); International Application No. PCT/JP2014/059967, filed Apr. 4, 2014; 8 pages.

\* cited by examiner

(a) BEFORE APPLICATION (b) BEFORE APPLICATION

BOUNDARY LINE RECOGNIZER DEVICE

CROSS-REFERENCE TO RELATED APPLICATION

This application is based on and claims the benefit of priority from earlier Japanese Patent Application No. 2013-080477 filed Apr. 8, 2013, the description of which is incorporated herein by reference.

BACKGROUND

Technical Field

The present invention relates to a boundary line recognizer device recognizing a boundary line separating a lane where the vehicle is traveling on the basis of an image captured by a camera mounted on a vehicle.

Related Art

For preventing deviation of vehicles from lanes or automatically steering control, boundary line recognizer devices, which processes images captured by cameras mounted on the vehicles and recognizes boundary lines separating the lanes where the vehicles are traveling, have been suggested. Especially, as the boundary line recognizer devices, boundary line recognizer devices discriminating a proper boundary line which is a control objective of the vehicle from multiple dividing lines have been suggested.

For example, in PTL1, dividing line candidates are detected in a multiple dividing lines detection area, it is determined which type each dividing line candidate is, and it is decided what relative positional relationship each dividing line candidate whose type is determined has to configure the multiple dividing lines. Further, the boundary line candidate having the largest degree of continuity to the boundary line which has been detected until the vehicle enters the area where the multiple dividing lines are provided is selected, thereby establishing the boundary line.

CITATION LIST

Patent Literature

[PTL1] JP-A-2010-205175

SUMMARY

However, depending on types of the dividing line, for example, there is a case of a so-called jagged line. The jagged line is composed of an outer continuous dividing line and an inner dashed dividing line, the distance between the continuous dividing line and the dashed dividing line is short, and the gaps between line portions of the dashed lines are long. In the case of the jagged line, if resolution of the image is low, the edge between the continuous dividing line and the dashed dividing line is sometimes not detected.

PTL1 does not disclose any process for this case, and might not detect the boundary line when the multiple lines are a jagged line. Even if the boundary line can be detected, according to the shape of the jagged line, the boundary line whose position in the lateral direction changes at the line portions and gap portions of the dashed dividing line might be detected. Accordingly, even if the boundary line can be detected, the vehicle might wobble when the vehicle is automatically controlled on the basis of the determined boundary line.

In light of the above actual circumstances, the present invention has a main object to provide a boundary line recognizer device which can recognize a proper boundary line regardless of types of dividing lines, especially of multiple dividing lines.

To resolve the problem, the invention according to claim 1 is a boundary line recognizer device, and has a camera mounted on a vehicle and capturing an image of a lane; an edge point extraction section extracting edge points on the basis of luminance of the image captured by the camera; a candidate line extraction section extracting a candidate line for a boundary line separating the lane on the basis of a succession of the extracted edge points; a frequency calculator section calculating, on the basis of the edge points on the candidate line extracted by the candidate line extraction section, a frequency distribution of the edge points against a parameter for specifying a width of the boundary line; and a probability generation section generating a probability distribution of the candidate line being the boundary line against the parameter on the basis of the frequency distribution calculated by the frequency calculator section; and a boundary line recognizer section recognizing the boundary line on the basis of the probability distribution generated by the probability generation section.

According to this configuration, edge points of the boundary line separating the lane are extracted from the luminance of the image captured by the camera mounted on the vehicle, and the candidate line for the boundary line is extracted from the succession of the extracted edge points. Further, the frequency distribution of the edge points against the parameter specifying the boundary line width is calculated on the basis of the edge points on the extracted candidate line. That is, the frequency distribution of the edge points corresponding to the boundary line width is calculated.

The probability distribution of the candidate line being the boundary line to the parameter specifying the boundary line width is generated on the basis of the calculated frequency distribution. The boundary line is recognized from the candidate line on the generated probability distribution. That is, the probability of the width of each candidate line being valid as the boundary line width is calculated, and the candidate line valid as the boundary line is recognized on the basis of the probability. Accordingly, even if multiple boundary lines are a jagged line, of these, the candidate line having the width valid as the boundary line is selected, thereby the proper boundary line can be recognized.

DETAILED DESCRIPTION OF PREFERRED EMBODIMENTS

With reference to the drawings, hereinafter is described each embodiment in which a boundary line recognizer device is mounted on a vehicle. It should be noted that, in each following embodiment, the same or substantially same portions are labelled with the same reference symbols in the drawings, and the same description applies for the portions having the same reference symbol.

First Embodiment

Figure 1:
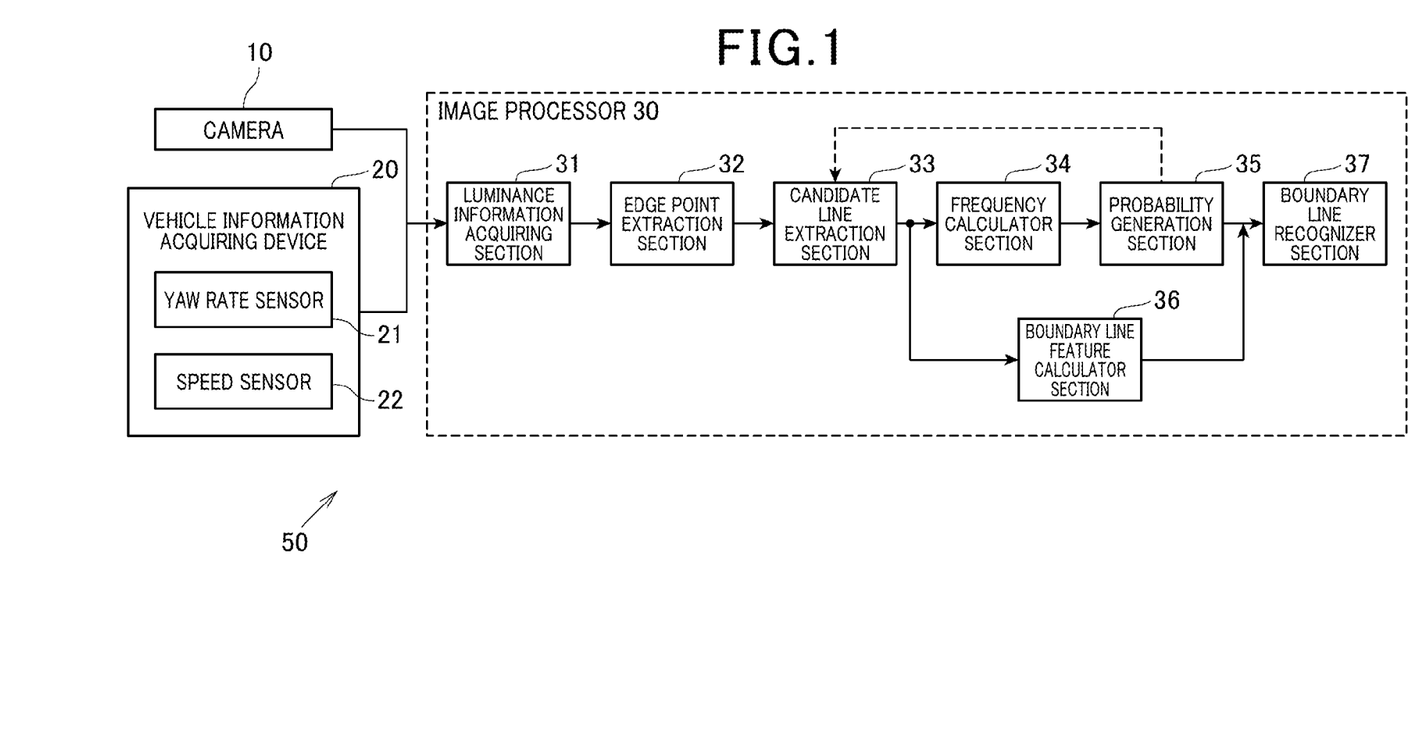
FIG. 1 is a block diagram showing configurations of a boundary line recognizer device.

With reference to FIG. 1, the configuration of the boundary line recognizer device 50 according to the present embodiment is described. The boundary line recognizer device 50 has a camera 10, a vehicle information acquiring device 20 and an image processor 30.

The camera 10 is, for example, CCD camera, and is fixed to face ahead of the vehicle, for example, behind a rearview mirror such that the camera can image a lane ahead of the vehicle. The camera 10 captures images the lane ahead of the vehicle, and outputs the captured image information to the image processor 30.

The vehicle information acquiring device 20 has a yaw rate sensor 21 and a vehicle speed sensor 22. The vehicle information acquiring device 20 calculates a curvature of the center of the lane on the basis of the vehicle velocity detected by the vehicle speed sensor 22 and the angular velocity (yaw rate) to the turning direction of the own vehicle which is detected by the yaw rate sensor 21. The vehicle information acquiring device outputs the calculated curvature of the lane to the image processor 30. The image processor 30 uses the calculated curvature of the lane for estimating the position of the boundary line.

The image processor 30 is configured as a microcomputer having a CPU, a ROM, a RAM, an I/O and bus lines connecting them. In this embodiment, the CPU executes programs stored in the ROM, thereby realizing functions of a luminance information acquiring section 31, an edge point extraction section 32, a candidate line extraction section 33, a frequency calculator section 34, a probability generation section 35, a boundary line feature calculator section 36, and a boundary line recognizer section 37.

The luminance information acquiring section 31 converts color information in a predetermined area into luminance to obtain the luminance information. The predetermined area is a necessary area for detecting lane boundary lines in the image captured by the camera 10. The edge point extraction section 32 searches up-edge points and down-edge points toward a direction away from the vehicle of horizontal directions H (see FIG. 5) in the predetermined area where the luminance conversion has been performed, thereby extracting a plurality of edge points. The up-edge point is a point where the luminance sharply rises. The down-edge point is a point where the luminance sharply lowers.

The candidate line extraction section 33 executes a transform such as a Hough transform for successions of the up-edge points and the down-edge points to extract a plurality of candidate lines for boundary lines separating both sides of the lane where the own vehicle is traveling. The extracted candidate lines include a pair of an outer edge line and an inner edge line. The outer edge line includes down-edge points where the luminance changes from high to low, and the inner edge line includes up-edge points where the luminance changes from low to high.

The frequency calculator section 34 calculates frequency distribution of the edge points to a parameter specifying the width of the boundary line on the basis of the edge points on the candidate line extracted by the candidate line extraction section 33, every time the vehicle travels a predetermined distance. That is, the frequency calculator section 34 calculates the frequency distribution of the edge points against the parameter specifying the boundary line width on the basis of the images captured by the camera 10 during the vehicle travels the predetermined distance. In this embodiment, the parameter specifying the width of the boundary line is the width of the candidate line. The frequency calculator section 34 calculates the distribution of the frequency of the edge points on the candidate lines against the widths of the candidate lines. The frequency distribution calculated by the frequency calculator section 34 is described in detail below.

The probability generation section 35 generates the probability distribution of the candidate line being the boundary line to the parameter specifying the boundary line width on the basis of the frequency distribution calculated by the frequency calculator section 34. In this embodiment, the probability distribution of the candidate line being the boundary line against the candidate line width. The probability distribution generated by the probability generation section 35 is described in detail below.

The boundary line feature calculator section 36 calculates a probability of the candidate line being the boundary line on the basis of how much the candidate line extracted by the candidate line extraction section 33 has features of the boundary line. In detail, regarding each of the features, the boundary line feature calculator section calculates the degree of the candidate line having the feature, and calculates the probability of the candidate line being the boundary line to be higher as the degree of having the features of the boundary line is larger. The features of the boundary line can include a feature that the number of the edge points included in the candidate line is larger than a predetermined value, a feature that the length of the candidate line is larger than a predetermined value, a feature that the edge intensity of the edge point is larger than a predetermined value, and the like.

The boundary line recognizer section 37 integrates, for each of the candidate lines extracted by the candidate line extraction section 33, the probabilities of being the boundary line. One of the probabilities of being the boundary line has been calculated from the candidate line width and the probability distribution generated by the probability generation section 35. The others have been calculated for the respective features of the boundary line by the boundary line feature calculator section 36. The boundary line recognizer section 37 selects the likeliest candidate line for the boundary line on the basis of each integrated probability of each candidate line being the boundary line, and recognizes the selected candidate line as the boundary line. In detail, of the candidate lines having the integrated probability higher than a determination value determinable as the boundary line, the candidate lines configuring a pair of left side and right side of the vehicle and having the highest probability are selected.

The inner edge line of the candidate line, which is recognized as the boundary line by the boundary line recognizer section 37, is set as a control objective, and various controls for the vehicle are performed. In case of automatic control of the vehicle, the steering amount of the vehicle is set on the basis of the shape of the inner edge line of the candidate line which has been recognized as the boundary line. In case of keeping the vehicle in the traveling lane, when the vehicle moves out of the inner edge line of the candidate line recognized as the boundary line, an alarm sound is outputted.

Figure 2:
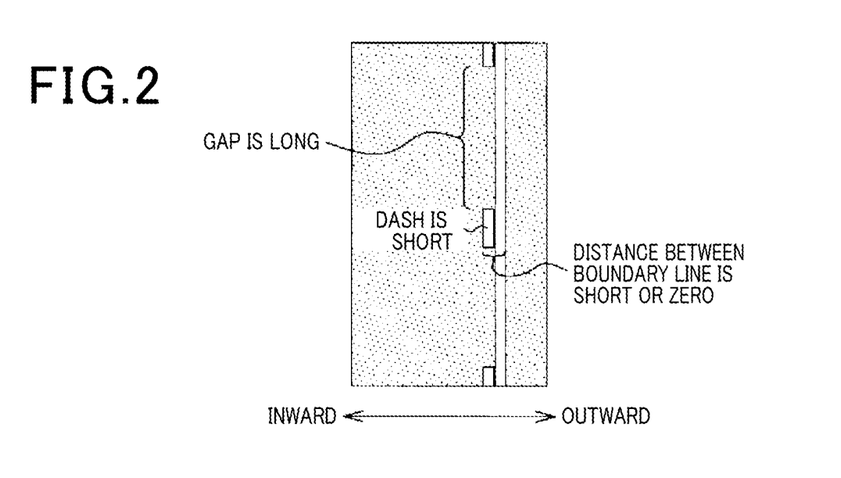
FIG. 2 is a view showing a jagged line.

Next is described the frequency distribution calculated when the dividing line is a jagged line. As shown in FIG. 2, the jagged line is formed by multiple dividing lines composed of an outer continuous dividing line and an inner dashed dividing line. In the jagged line, there is no gap or a short gap between the continuous dividing line and the dashed dividing line, and the gaps between the dashes are longer the length of the dash. Accordingly, the edge between the continuous dividing line and the dashed paring line is not detected sometimes depending on resolution of the image. Here, the case that the edge between the continuous dividing line and the dashed paring line is not detected will be considered.

In this case, an outer edge line corresponding to the outer edge of the continuous dividing line, an inner edge line corresponding to the inner edge of the continuous dividing line, and another inner edge line corresponding to the inner edge of the dashed dividing line are extracted. That is, a plurality of candidate lines along the lane direction (the vertical direction of the image), i.e. a candidate line consisting of a pair of the outer edge line and the inner edge line corresponding to the continuous dividing line and another candidate line consisting of a pair of the outer edge line corresponding to the continuous dividing line and the inner edge line corresponding to the dashed dividing line, are extracted. The number of the edge points on the candidate line consisting of the outer edge line and the inner edge line corresponding to the continuous dividing line is larger than that of the edge points on the candidate line consisting of the outer edge line corresponding to the continuous dividing line and the inner edge line corresponding to the dashed dividing line.

Further, the width of the continuous dividing line is defined as a, and the width of the sum of the width of the continuous dividing line and the width of the dashed dividing line is defined as b. The distance between the edge point included in the outer edge line corresponding to the continuous dividing line and the edge point included in the inner edge line corresponding to the continuous dividing line, i.e. the width of the candidate line consisting of the outer edge line and the inner edge line corresponding to the continuous dividing line, is close to a. On the other hand, the distance between the edge point included in the outer edge line corresponding to the continuous dividing line and the edge point included in the inner edge line corresponding to the dashed dividing line, i.e. the width of the candidate line consisting of the outer edge line corresponding to the continuous dividing line and the inner edge line corresponding to the dashed dividing line, is close to b. Accordingly, in the frequency distribution calculated when the dividing line is the jagged line, as shown in FIG. 3, the frequency of the edge points corresponding to the candidate line width a is the largest local maximum frequency, i.e. the largest frequency, and the frequency of the edge points corresponding to the candidate line width b is another local maximum frequency smaller than the largest frequency.

If the edge between the continuous dividing line and the dashed dividing line is detected, the edge line between the continuous dividing line and the dashed dividing line is an outer edge line. Accordingly, in this case, a candidate line having a width close to the width of the dashed dividing line is extracted other than the candidate lines having the width of a or b. The frequency distribution shows local maximum frequencies at the candidate line width b and the width of the dashed dividing line, the local maximum frequencies being different from the largest local maximum frequency.

Figure 3:
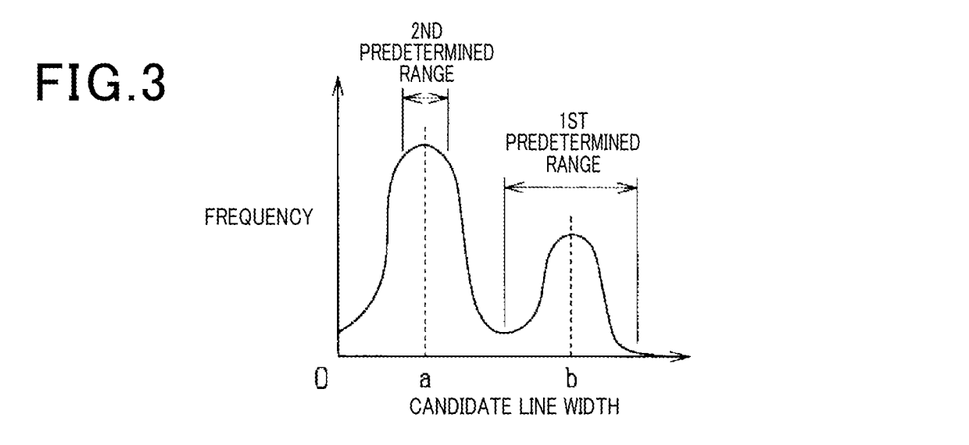
FIG. 3 is a graph showing a frequency distribution of edge points to boundary line candidate widths.

Next is described the probability distribution generated by the probability generation section 35 on the basis of the frequency distribution of FIG. 3. The candidate line which should be recognized as the boundary line is the candidate line having the width showing the largest local maximum frequency, i.e. the candidate line corresponding to the continuous dividing line. On the other hand, it is desired that the candidate lines having the widths showing the second-largest and third-largest frequency are not recognized as the boundary line. Accordingly, the probability distribution of the candidate line width is not set to have the same distribution profile as the frequency distribution has. In the probability distribution, the probability of the candidate being the boundary line is reduced relative to the frequency in a first predetermined range. The first predetermined range includes the candidate line width b at which the frequency distribution shows the local maximum frequency different from the largest local maximum frequency. The first predetermined range is a range of the candidate line width where the frequency is large around the candidate line width b in the frequency distribution.

On the other hand, it is desired that the candidate line having the candidate line width a showing the largest maximum frequency is easily recognized as the boundary line. Accordingly, the probability of the candidate line being the boundary line is set to be largest in a second predetermined range including the candidate line width a showing the largest local maximum frequency in the frequency distribution. Further, it is desired that the candidate line is more difficult to be recognized as the boundary line, as the candidate line width is farther away from the candidate line width a. For this purpose, the probability of the candidate line being the boundary line is set to be lower as the candidate line width is farther away from the candidate line width a showing the largest local maximum frequency in the frequency distribution. It should be noted that the second predetermined range is a range of the candidate line width where the frequency is close to the maximum frequency around the candidate line width a in the frequency distribution.

The probability distribution generated by the probability generation section 35 as described above shows, as shown in FIG. 4, the largest probability in the second predetermined range around the candidate line width a, lower probabilities with the difference from the candidate line width a increasing, and the smallest probability in the first predetermined range around the candidate line width b. Using this probability distribution makes it easier to recognize the candidate line corresponding to the continuous dividing line of the jagged line as the boundary line, which makes it more difficult to recognize the other candidate lines as the boundary line.

Figure 5:
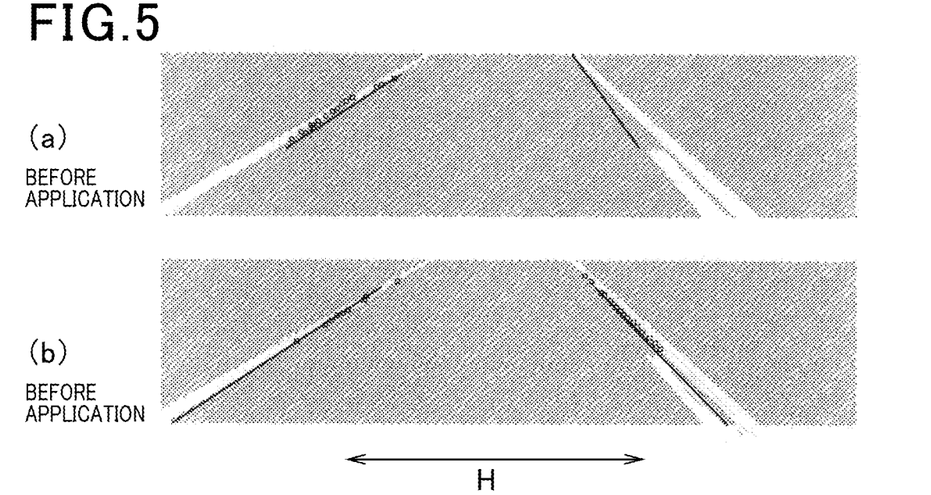
FIG. 5 is view showing status before and after applying the probability distribution of a candidate line being a boundary line to boundary line candidate widths.

FIGS. 5 (a) and (b) shows an exemplary boundary line which is recognized by the boundary line recognizer section 37, when the boundary line on the right side of the vehicle is the jagged line. FIG. 5 (a) is a view showing the boundary line which is recognized, when the probability of being the boundary line which is calculated from the candidate line width and the probability distribution generated by the probability generation section 35 is not reflected on the integrated probability of being the boundary line. On the other hand, FIG. 5 (b) is a view showing the boundary line which is recognized, when the probability of being the boundary line which is calculated from the candidate line width and the probability distribution generated by the probability generation section 35 is reflected on the integrated probability of being the boundary line. In FIGS. 5 (a) and (b), the continuous lines show the inner edge lines of the candidate lines recognized as the boundary lines, and the square points show edge points recognized as the edge points of the boundary line in the upper area of the image.

In FIG. 5 (a), because there is no square point on the right boundary line in the upper area of the image, no inner edge point of the continuous dividing line has been recognized. The inner edge line of the candidate line recognized as the boundary line extends from the inner side of the dashed dividing line toward the inner side of the continuous dividing line. That is, in a portion where the dashed dividing line overlaps the continuous dividing line, the candidate line having a width of the sum of the width of the continuous dividing line and the width of the dashed dividing line is recognized as the boundary line. In a portion where the dashed dividing line does not overlap the continuous dividing line, the candidate line corresponding to the continuous dividing line is recognized as the boundary line. Accordingly, since the width of the lane changes, if the recognized candidate line is set as the control objective, the control of the vehicle might be unstable.

Compared to this, in FIG. 5 (b), since there are square points on the right boundary line in the upper area of the image, the inner edge points of the continuous dividing line have been recognized. The inner edge line of the candidate line recognized as the boundary line extends along the inner side of the continuous dividing line. That is, even in a portion (the portion having the different candidate line) where the dashed dividing line overlaps the continuous dividing line, the candidate line (or a line continuous to the candidate line or the extended candidate line having the same width) corresponding to the continuous dividing line is recognized as the boundary line, and the candidate line having the width of the sum of the width of the continuous dividing line and the width of the dashed dividing line is not recognized as the boundary line. Accordingly, the width of the recognized lane is constant. This enables stable control of the vehicle using the recognized candidate line as the control objective.

The first embodiment described above shows the following effects.

The probability of each width of candidate lines being valid as the width of the boundary line is calculated on the basis of the frequency of the edge points on the candidate line, and the valid candidate line as the boundary line is recognized on the basis of the resultant probability. Accordingly, even if multiple dividing lines are a jagged line, the candidate line having a valid width as the boundary line is selected among them, thereby the proper boundary line can be recognized.

The probability of the candidate line being the boundary line is reduced in the first predetermined range including the candidate line width at which the frequency distribution shows the local maximum frequency different from the largest local maximum frequency. This reduces the possibility of recognizing as the boundary line the candidate lines having widths showing the second-largest and third-largest local maximum frequency. Accordingly, if multiple dividing lines are a jagged line, the possibility of recognizing as the boundary line the candidate line having a width within a given range is reduced, the given range including the width of the dashed dividing line or the width of the sum of the width of the continuous dividing line and the width of the dashed dividing line. As a result, even if multiple dividing lines are a jagged line, false recognition of the boundary line can be prevented. Further, the vehicle can be kept stably in the lane.

The probability of the candidate line being the boundary line is set largest in the second predetermined range including a parameter value showing the largest frequency in the frequency distribution. This makes it easier to recognize as the boundary line the candidate line having a width close to the candidate line width at which the frequency is largest. Accordingly, even if multiple dividing lines are a jagged line, the proper boundary line can be recognized.

At the value of the candidate line width at which the frequency is the largest local maximum, the probability of the candidate line being the boundary line becomes largest, and the probability of recognizing the candidate line as the boundary line becomes lower as the width is farther away from the value. Accordingly, even if multiple dividing lines are a jagged line, the proper boundary line can be recognized.

The candidate line width is set as the parameter specifying the boundary line width. Thereby, the frequency distribution of the edge points to the candidate line width can be calculated. Further, the probability distribution of the candidate line being the boundary line to the candidate line width can be generated.

The frequency distribution is calculated on the basis of the images accumulated during traveling a predetermined distance. Accordingly, at the time when a certain amount of frequency is accumulated, the frequency distribution can be calculated. This can increase reliability of the frequency distribution, which can enable preparation of an accurate probability distribution.

The probability based on the candidate line width and the probability based on the degree of having the respective features of the boundary line are integrated to recognize the boundary line. Accordingly, even if multiple dividing lines form a jagged line, the proper boundary line can be recognized accurately.

Second Embodiment

Next are described points different from the first embodiment regarding a second embodiment. In the second embodiment, the position of the outer edge line and the position of the inner edge line in the horizontal direction of the image are set as the parameters specifying the width of the boundary line. The frequency calculator section 34 calculates a frequency distribution of edge points against the position of the outer edge line and the position of the inner edge line in the horizontal direction of the image, every time the vehicle travels a predetermined distance. The probability generation section 35 generates, on the basis of the frequency distribution generated by the frequency calculator section 34, a probability distribution of the candidate line being the boundary line against the position of the outer edge line and the position of the inner edge line in the horizontal direction of the image.

Next is described the frequency distribution which is generated when the boundary line forms a jagged line. Here, the case that the edge between the continuous dividing line and the dashed paring line is not detected will be considered. It is assumed that, in the horizontal direction of the image, the outer edge of the continuous dividing line is disposed at a position which is a distance c from an outer end, and the inner edge of the continuous dividing line is disposed at a position which is a distance d from the outer end. Further, it is assumed that, in the horizontal direction of the image, the inner edge of the dashed dividing line is at a position which is a distance e from the outer end. It should be noted that the outer end means both right and left ends of the search range or both right and left ends of the image.

At first is described edge points on the outer edge line. In this case, the horizontal position of the edge points of the outer edge line corresponding to the continuous dividing line is near the distance c from the outer end. Accordingly, the frequency distribution of the edge points to the positions of the outer edge line, which is calculated by the frequency calculator section 34, is a distribution showing the largest local maximum frequency at the distance c, as shown by the continuous line of FIG. 6. On the other hand, since the edge between the continuous dividing line and the dashed dividing line is not detected, no edge point on the outer edge line corresponding to the dashed dividing line is detected.

If the edge points between the continuous dividing line and the dashed dividing line are detected, the frequency distribution of the positions of the outer edge line shows the largest frequency at the distance d, and shows, at the distance d, a local maximum frequency different from the largest local maximum frequency (not shown in the drawings). The number of the edge points on the outer edge line corresponding to the continuous dividing line is larger than the number of the edge points on the outer edge line (the outer edge line of the dashed dividing line) between the continuous dividing line and the dashed dividing line. Accordingly, the largest frequency is shown at the distance c, and the second-largest local maximum frequency is shown at the distance d.

Subsequently, the edge points on the inner edge line are described. The horizontal position of the edge points on the inner edge line corresponding to the continuous dividing line is near the distance d from the outer end. The horizontal position of the edge points on the inner edge line corresponding to the dashed dividing line is near the distance e from the outer end. Accordingly, the frequency distribution of the edge points to the positions of the inner edge line, which is calculated by the frequency calculator section 34, shows the largest local maximum frequency at the distance d, and shows, at the distance e, a local maximum frequency different from the largest local maximum frequency, as shown by the dashed line of FIG. 6. The number of the edge points on the inner edge line corresponding to the continuous dividing line is larger than the number of the edge points on the inner edge line corresponding to the dashed dividing line. Accordingly, the largest frequency is shown at the distance d, and the second-largest local maximum frequency is shown at the distance e.

The distance between the distance c and the distance d is the candidate line width a showing the largest frequency in the frequency distribution of FIG. 3, i.e. the width of the continuous dividing line. The distance d shows the largest frequency in the frequency distribution of the positions of the outer edge line, and the distance d shows the largest frequency in the frequency distribution of the positions of the inner edge line. The distance between the distance c and the distance e is the candidate line width b showing the local maximum frequency different from the largest local maximum in the frequency distribution of FIG. 3, i.e. the width which is the sum of the width of the continuous dividing line and the width of the dashed dividing line.

Figure 6:
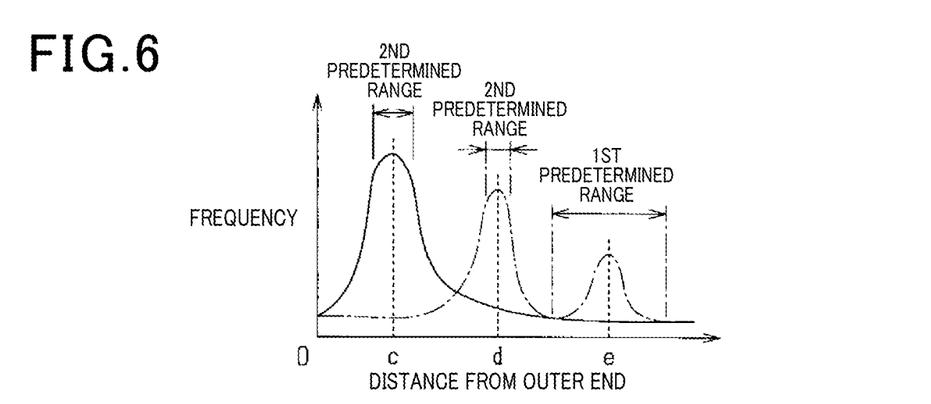
FIG. 6 is a graph showing a frequency distribution of edge points against positions of an outer edge line and an inner edge line.

Next is described the probability distribution generated by the probability generation section 35 on the basis of the frequency distribution of FIG. 6. It is desired the candidate line having the width showing the largest local maximum frequency, i.e. the candidate line corresponding to the continuous dividing line, is easily recognized as the boundary line. It is also desired that the candidate line having a width showing a local maximum frequency different from the largest frequency is not recognized as the boundary line.

Figure 7:
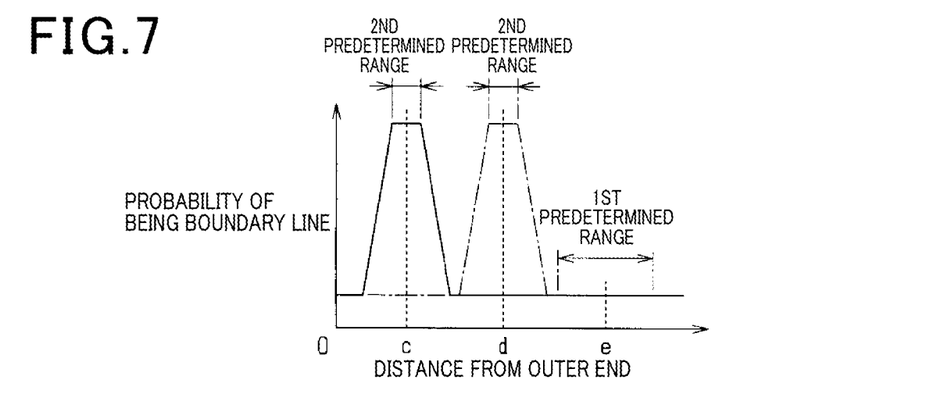
FIG. 7 is a graph showing a probability distribution of a candidate line being a boundary line against the positions of the outer edge line and the inner edge line.

The frequency distribution of the edge points on the outer edge line shown in FIG. 6 shows only the largest local maximum frequency at the distance c, and does not show any local maximum frequency different from the largest local maximum frequency. Accordingly, the probability distribution of the positions of the outer edge line is set as shown in FIG. 7 such that the probability of the candidate line being the boundary line is largest in a second predetermined range including the distance c showing the largest local maximum frequency in the frequency distribution. It is also set such that the probability of the candidate line being the boundary line become smaller as the position of the outer edge line is farther away from the distance c.

If the outer edge line between the continuous dividing line and the dashed dividing line is detected, the probability of the candidate line being the boundary line is set to be reduced in a first predetermined range (not shown in the drawings) including the distance d. This is because a local maximum frequency different from the largest frequency is shown at the distance d. The first predetermined range in this case is the range where the frequency is large around the distance d between the continuous dividing line and the dashed dividing line in the frequency distribution. The second predetermined range is the range of the position of the outer edge line where the frequency distribution has a frequency close to the largest frequency around the distance c. The first predetermined range in this case overlaps the following second predetermined range in the frequency distribution of the inner edge line.

Similarly, the probability distribution of position of the inner edge line is set as shown by the dot-and-dash line of FIG. 7 such that the probability of the candidate line being the boundary line is reduced in a first predetermined range including the distance e showing the local maximum frequency different from the largest frequency in the frequency distribution. The probability of the candidate line being the boundary line is set largest in a second predetermined range including the distance d showing the largest frequency in the frequency distribution, and the probability of the candidate line being the boundary line is set smaller as the position of the inner edge line is farther away from the distance d. The first predetermined range is the range of the position of the inner edge line where the frequency is large around the distance e in the frequency distribution. The second predetermined range is the range of the position of the inner edge line where the frequency distribution shows frequency close to the largest local maximum frequency around the distance d.

Using the probability distribution shown in FIG. 7 makes it easy to recognize as the boundary line the candidate line composed of the outer edge line at the position of the distance c and the inner edge line at the position of the distance d, i.e. the continuous line of the jagged line. The probability of recognizing as the boundary line the candidate line composed of the outer edge line at the position of the distance c and the inner edge line at the position of the distance e becomes smaller.

In the second embodiment described above, the candidate line width can be specified by using the position of the outer edge line and the inner edge line in the horizontal direction of the image as parameters. Accordingly, the frequency distribution can be calculated of the edge points corresponding to the candidate line width, and the probability distribution of the candidate line being the boundary line to the candidate line distribution can be generated.

Other Embodiments

The present invention is not limited to the description of the above embodiments, and may be modified and performed as follows.

The frequency calculator section 34 calculates the frequency distribution on the basis of the images which are captured by the camera 10 under a condition where the vehicle travels for a predetermined time. Even in this case, since the frequency distribution can be calculated at the time when a certain amount of frequency has been accumulated, reliability of the frequency distribution can be increased.

As shown by the dashed arrow of FIG. 1, the candidate line extraction section 33 may extract candidate lines on the basis of the successions of the edge points extracted by the edge point extraction section 32 and the probability distribution generated by the probability generation section 35. Using the generated probability distribution in addition to the successions of the edge points prevents extraction of noise, which enables more accurate extraction the candidate lines of the boundary line. As a result, accuracy of recognition of the boundary line can be improved.

Figure 4:
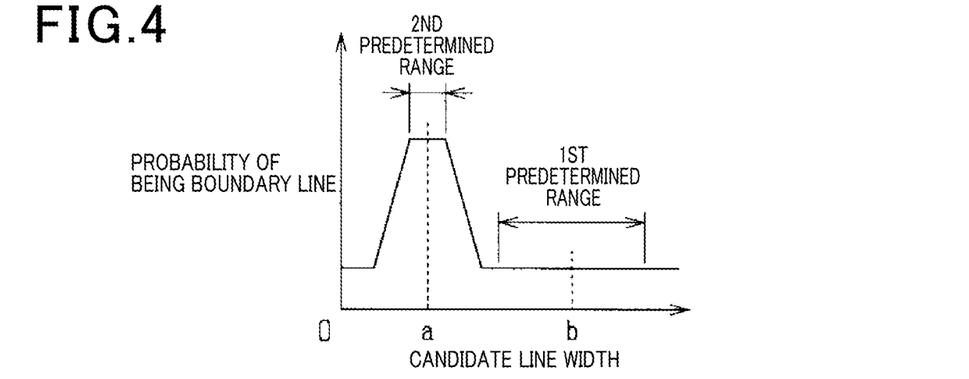
FIG. 4 is a graph showing a probability distribution of a candidate line being a boundary line against boundary line candidate width.

In the second embodiment, the probability generation section 35 may specify the candidate line width on the basis of the position of the outer edge line and the position of the inner edge line to generate the probability of the candidate line being the boundary line to the candidate line width as shown in FIG. 4. Further, if the boundary line feature calculator section 36 is set to select the candidate line including the larger number of the edge points more easily, the boundary line can be accurately selected from the jagged line.

The probability generation section 35 may set the probability of the candidate line being the boundary line to be largest in the second predetermined range including the parameter value showing the largest local maximum frequency in the frequency distribution, and to be smallest in a range except for the second predetermined range. That is, the probability distribution may be set to have non-continuous two values.

Generally, the control objective is the inner edge line of the candidate line recognized as the boundary line. Accordingly, in the first embodiment, the probability generation section 35 may generate the probability distribution which makes it easy to recognize the inner edge line of the candidate line having the candidate line width a showing the largest frequency in the frequency distribution. In the second embodiment, the probability generation section 35 may not generate the probability distribution of the positions of the outer edge line but generate only the probability distribution of the positions of the inner edge line.

REFERENCE SIGNS LIST

10 . . . camera, 30 . . . image processor, 32 . . . edge point extraction, 34 . . . frequency calculator section, 35 . . . probability generation section, 37 . . . boundary line recognizer section.

The invention claimed is:

1. A boundary line recognizer device, comprising:
a camera mounted on a vehicle and capturing an image of a lane;
an edge point extraction section extracting edge points on the basis of luminance of the image captured by the camera;
a candidate line extraction section extracting a candidate line for a boundary line separating the lane on the basis of a succession of the extracted edge points;
a frequency calculator section calculating, on the basis of the edge points on the candidate line extracted by the candidate line extraction section, a frequency distribution of the edge points relative to a parameter for specifying a width of the boundary line;
a probability generation section generating a probability distribution of the candidate line being the boundary line relative to the parameter on the basis of the frequency distribution calculated by the frequency calculator section; and
a boundary line recognizer section recognizing the boundary line on the basis of the probability distribution generated by the probability generation section.

2. The boundary line recognizer device according to claim 1, wherein the probability generation section reduces the probability of the candidate line being the boundary line corresponding to the frequency in a first predetermined range, the first predetermined range including the parameter value at which the frequency distribution shows a local maximum frequency different from the largest local maximum frequency.

3. The boundary line recognizer device according to claim 1, the probability generation section sets the probability of the candidate line being the boundary line in a second predetermined range to the be largest, the second predetermined range including the parameter value at which the frequency distribution shows the largest local maximum frequency.

4. The boundary line recognizer device according to claim 1, wherein the probability generation section sets the probability of the candidate line being the boundary line to be smaller with the difference from the parameter value at which the frequency distribution shows the largest local maximum frequency increasing.

5. The boundary line recognizer device according to claim 1, wherein the candidate line extraction section extracts the candidate line on the basis of the succession of the edge points and the probability distribution generated by the probability distribution.

6. The boundary line recognizer device according to claim 1, wherein the parameter is a width of the candidate line.

7. The boundary line recognizer device according to claim 1, wherein the parameter is the positions of an outer edge line and an inner edge line of the candidate line in horizontal directions of the image.

8. The boundary line recognizer device according to claim 1, wherein the frequency calculator section calculates the frequency distribution on the basis of the images captured by the camera during the vehicle traveling a given distance.

9. The boundary line recognizer device according to claim 1, wherein the frequency calculator section calculates the frequency distribution on the basis of the images captured by the camera during the vehicle traveling for a given time.

10. The boundary line recognizer device according to claim 1, the boundary line recognizer section integrates the probability calculated from the probability distribution and degree of the candidate line having a plurality of features of the boundary line to recognize the boundary line.

* * * * *